(12) United States Patent
Tang et al.

(10) Patent No.: US 7,777,925 B2
(45) Date of Patent: Aug. 17, 2010

(54) APPARATUS AND METHOD FOR COLOR ADJUSTMENT

(75) Inventors: Sen-Huang Tang, Yilan County (TW); Chun-Hsing Hsieh, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 365 days.

(21) Appl. No.: 11/766,376

(22) Filed: Jun. 21, 2007

(65) Prior Publication Data

US 2007/0296987 A1 Dec. 27, 2007

(30) Foreign Application Priority Data

Jun. 23, 2006 (TW) ............... 95122821 A (51) Int. Cl.
*G03F 3/08* (2006.01)
*G06K 9/00* (2006.01)
*G09G 5/02* (2006.01)

(52) U.S. Cl. .............. 358/518; 358/519; 358/520; 358/521; 382/167; 345/589; 345/590; 345/591; 345/592; 345/593

(58) Field of Classification Search .............. None
See application file for complete search history.

(56) References Cited

U.S. PATENT DOCUMENTS

| | | | |
|---|---|---|---|
| 5,245,327 A | 9/1993 | Pleva et al. | |
| 6,140,997 A * | 10/2000 | Tanaka | 345/604 |
| 6,281,932 B1 | 8/2001 | Fukatsu et al. | |
| 7,020,329 B2 * | 3/2006 | Prempraneerach et al. | 382/164 |
| 2002/0063907 A1 * | 5/2002 | Harrington | 358/504 |
| 2002/0102018 A1 | 8/2002 | Lin et al. | |
| 2003/0044061 A1 * | 3/2003 | Prempraneerach et al. | 382/164 |
| 2004/0161265 A1 * | 8/2004 | Wilcox | 399/223 |
| 2005/0024657 A1 * | 2/2005 | Ota et al. | 358/1.9 |
| 2005/0264587 A1 * | 12/2005 | Kurumisawa | 345/690 |
| 2006/0238655 A1 * | 10/2006 | Chou | 348/645 |

* cited by examiner

*Primary Examiner*—Mark K Zimmerman
*Assistant Examiner*—Haris Sabah
(74) *Attorney, Agent, or Firm*—Thomas, Kayden, Horstemeyer & Risley, LLP (57) ABSTRACT

The present invention relates to a color adjustment apparatus and a method thereof. The color adjustment apparatus according to the present invention includes a calculation unit and an adjustment unit. The calculation unit receives an input color signal, and divides the input color signal into color groups and performs a calculation operation thereon to generate at least two calculation signals. The adjustment unit receives the calculation signals and the input color signal, and adjusts at least one of contrast group and complement group of the input color signal according to at least two of the calculation signals and a predetermined color value to generate an output color signal for a video-display apparatus. Accordingly, viewers can enjoy better visual experience.

20 Claims, 6 Drawing Sheets

| Color | Sum of pixels | Sum of angles | Average angle | Percentage (%) |
|---|---|---|---|---|
| Red | 14000 | 70000 | 5.0 | 70.0 |
| Green | 5000 | 590000 | 118.0 | 25.0 |
| Blue | 100 | 24400 | 244.0 | 0.5 |
| Cyan | 200 | 36200 | 181.0 | 1.0 |
| Magenta | 300 | 87000 | 290.0 | 1.5 |
| Yellow | 400 | 26000 | 65.0 | 2.0 |
| | 20000 | | | 100.0 |

Figure 1

| Color | Central Value | Lower Bound | Upper Bound |
|---|---|---|---|
| Red | 0.0 | -30.0 | 30.0 |
| Green | 120.0 | 90.0 | 150.0 |
| Blue | 240.0 | 210.0 | 270.0 |
| Cyan | 180.0 | 150.0 | 210.0 |
| Magenta | 300.0 | 270.0 | 330.0 |
| Yellow | 60.0 | 30.0 | 90.0 |

| Color | Sum of pixels | Sum of angles | Average angle | Percentage (%) |
|---|---|---|---|---|
| Red | 14000 | 70000 | 5.0 | 70.0 |
| Green | 5000 | 590000 | 118.0 | 25.0 |
| Blue | 100 | 24400 | 244.0 | 0.5 |
| Cyan | 200 | 36200 | 181.0 | 1.0 |
| Magenta | 300 | 87000 | 290.0 | 1.5 |
| Yellow | 400 | 26000 | 65.0 | 2.0 |
|  | 20000 |  |  | 100.0 |

APPARATUS AND METHOD FOR COLOR ADJUSTMENT

FIELD OF THE INVENTION

The present invention relates to color processing, and particularly to an apparatus and method for color adjustment.

BACKGROUND OF THE INVENTION

At present, in order to have vivid color performance, most video-display systems support adjustment methods for input color signals in a RGB (Red, Green, Blue) format, in a YCbCr (Luminance, B Chrominance, R Chrominance) format, or in an HIS (Hue, Intensity, Saturation) format. The color signal in an HIS format differentiates among the corresponding meanings of set values of H, I, and S by a coordinate method. The H represents a hue-coordinate. It is like angle-coordinate in a cylindrical coordinate system. Besides, it is periodic. Thereby, it is only necessary to set a corresponding color for an angle of circumference. The hue-coordinate, like the angle-coordinate, is divided into 360 degrees. Roughly speaking, the colors start gradually from red (the visible light with the longest wavelength) to purple (the visible light with the shortest wavelength), then return to red. The I (intensity-coordinate) and the S (saturation-coordinate) both are divided into 100 parts, and are represented by percentage. They are like the r-coordinate (radius-coordinate) and the z-coordinate (height-coordinate) in a cylindrical coordinate system; thereby I and S can be represented by using a planar orthogonal coordinate system.

Currently, most video-display systems adopt the formats described above, and manually adjust detailed associated values of colors to present preferred appearance of frames. However, in natural images, possibly due to complex background colors, adjusted colors still cannot perform strongly the desired presentation of frames. Alternatively, because when adjusting values of a single color, color-, intensity-, and saturation-coordinates of other colors will be affected, thereby colors will distort. Consequently, users' visual demands cannot be satisfied.

Accordingly, the present invention provides a color adjustment apparatus and a method thereof. Not only the drawback of monotonous and non-vivid colors in played frames can be improved, but also the presentation of other color will not be affected when adjusting colors. Thereby, users' visual experience can be enhanced significantly.

SUMMARY

The purpose of the present invention is to provide a color adjustment apparatus and a method thereof. By adjusting input color signals, the purpose of making colors of frames more vivid can be achieved.

Another purpose of the present invention is to provide a color adjustment apparatus and a method thereof. By adjusting input color signals, contrast colors or complementary colors can be more contradistinctive, and thereby the purpose of making colors of frames more vivid can be achieved. If different color groups belonging to contrast colors or complementary colors could be presented on the same frame, stronger visual perception can be thereby experienced.

Still another purpose of the present invention is to provide a color adjustment apparatus and a method thereof. By judging color state of color signals, a portion of colors can be adjusted and thereby the purpose of significant improvement for vividness of frames can be achieved.

The color adjustment apparatus according to the present invention includes a calculation unit and an adjustment unit. The calculation unit is used for receiving an input color signal, dividing it into color groups, and performing a calculation operation thereon to generate at least two calculation signals. According to at least two of the calculation signals and a predetermined color value, the adjustment unit adjusts at least one of contrast group and complement group of the input color signal to generate an output color signal.

DETAILED DESCRIPTION

Because there exists numerous color formats, color signals in the HIS format are used for further description in the present embodiment. However, the present invention is not limited to applications in the HIS format only.

Figure 1:
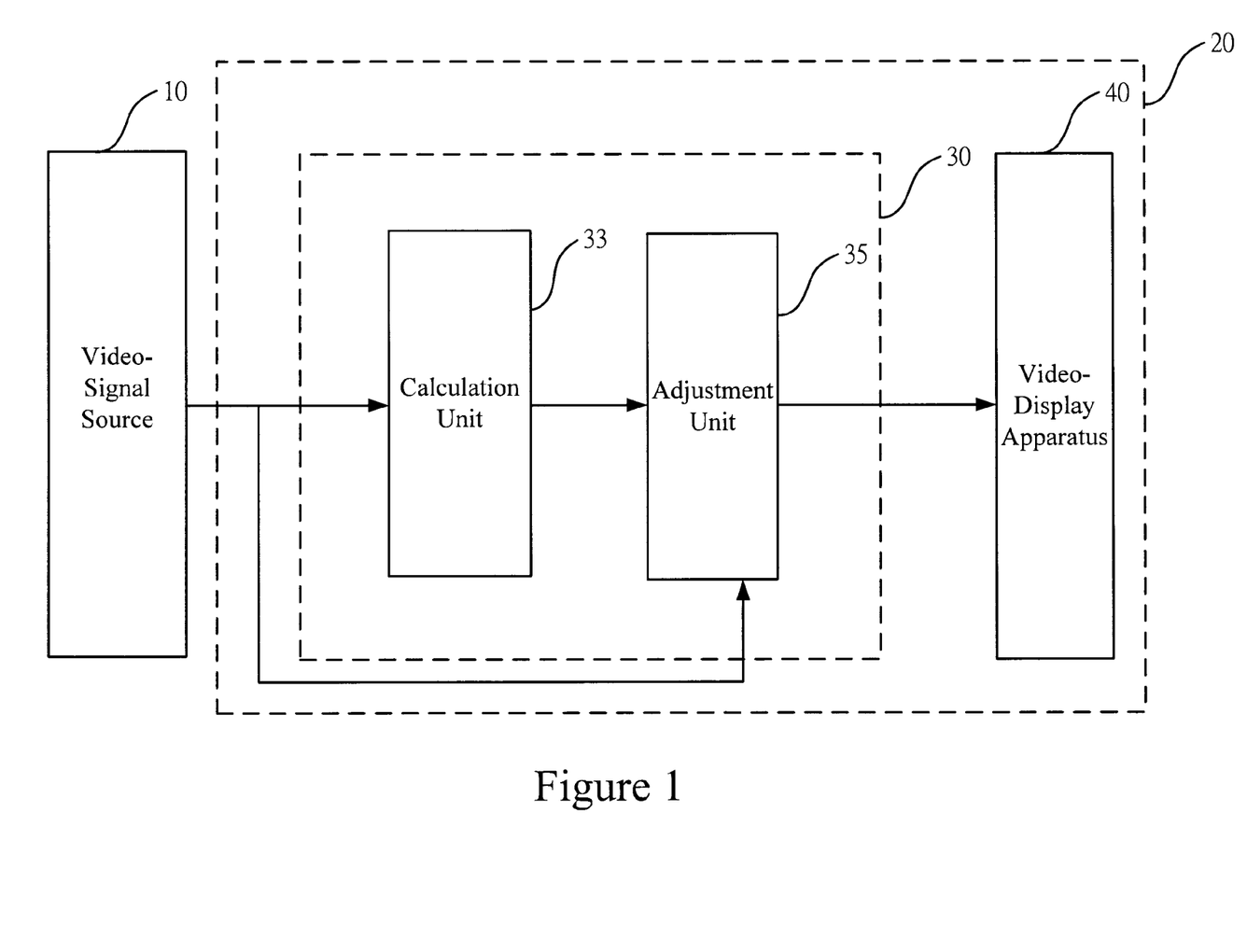
FIG. 1 is a block diagram according to a preferred embodiment of the present invention.

FIG. 1 is a block diagram according to a preferred embodiment of the present invention. As shown in FIG. 1, a video-signal source 10 transmits a video signal to a video-display system 20. Video signals are processed by a color adjustment apparatus 30, which is included in the video-display system 20, and are outputted to a video-display apparatus 40 for playing. Here, the video signals in the present embodiment are color signals in an HIS format.

Figure 2:
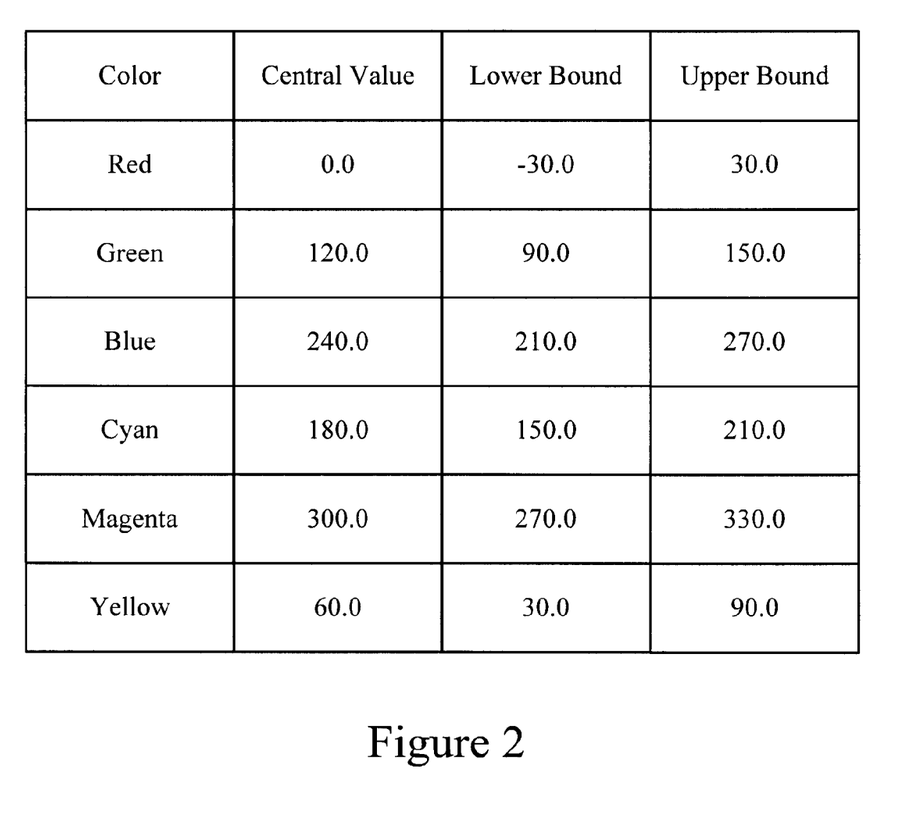
FIG. 2 is a table of predetermined color values according to a preferred embodiment of the present invention.

The color adjustment apparatus 30 according to the present invention includes a calculation unit 33 and an adjustment unit 35. The calculation unit 33 is utilized for dividing an input color signal into color groups and for performing a calculation operation thereon to generate at least two calculation signals for the adjustment unit 35. According to at least two of the calculation signals and a predetermined color value, the adjustment unit 35 adjusts the input color signal to generate an output color signal, with which the video-display apparatus can play. Thereby, more vivid color frames can be presented. Refer to FIG. 2 for the predetermined color values. FIG. 2 includes phase angles in the hue-coordinate of predetermined colors contrasting to each other at the upper bound, the lower bound, and the central value. In addition, the predetermined color values can be applied to other formats, not limited to the hue-coordinate of predetermined colors in contrast to each other to achieve the purpose of adjustment. In a preferred embodiment, the color adjustment apparatus 30 can adjust the input color to be brighter or more vivid colors in accordance with complementary colors and/or contrast colors.

Continued from the preceding paragraph, the present embodiment achieves the purpose of vivid frames by adjusting contrast colors of input color signals in HIS format. For examples, the contrast colors include three sets, which are red-cyan contrast, green-magenta contrast, and blue-yellow contrast; for examples, complementary colors include red-green complement, orange-blue complement, and yellow-purple complement. The color adjustment apparatus 30 according to the present embodiment utilizes the adjustment unit 35 to adjust the contrast colors described above so that the played frames can be more vivid. According to the predetermined phase-angle values of the hue-coordinate of the contrast colors, the calculation unit 33 performs a calculation operation on the input color signals in HIS format.

Figure 3:
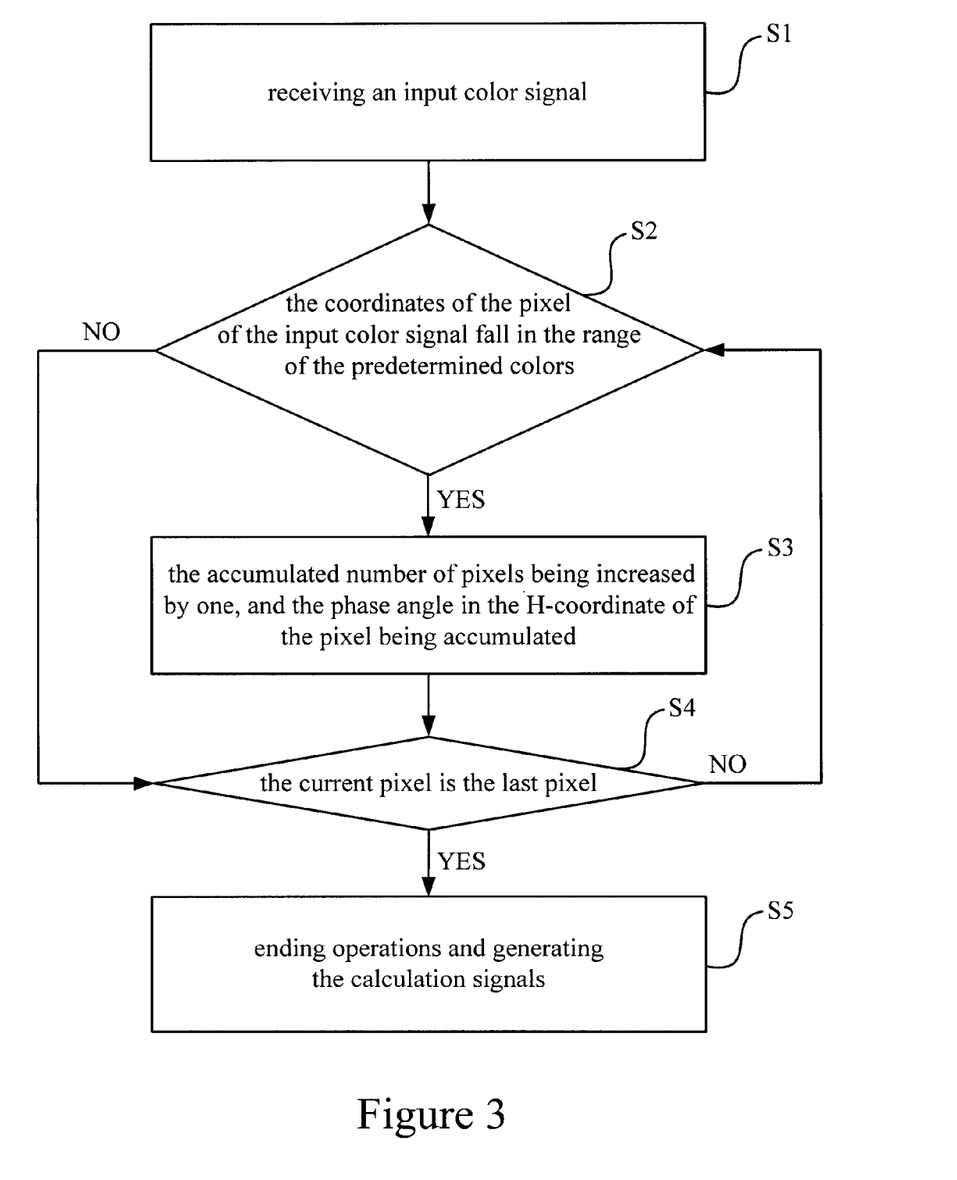
FIG. 3 is a flowchart of performing a calculation operation on color signals according to a preferred embodiment of the present invention.

FIG. 3 is a flowchart of performing a calculation operation on color signals according to a preferred embodiment of the present invention. In the step S1, the calculation unit 33 receives an input color signal in HIS format. In the step S2, the calculation unit 33 judges if the coordinates of pixel of the input color signal fall in the range of the predetermined colors. For examples, the calculation unit 33 compares the H-coordinates of pixel of the input color signal with the H-coordinate ranges of the predetermined colors. In the step S3, if the coordinates of the pixels fall in the range, then the accumulated number of pixels is increased by one, and the phase angle in the H-coordinate of the pixel is accumulated. In the step S4, judgment will be made to determine if the current pixel is the last pixel. If not, move back to the step S2 to repeat the operations described above. If the current pixel is the last one, then move to the step S5 to end operations, and to generate the calculation signals to the adjustment unit 35 for subsequent operations. In the step S2 described above, if the pixel is not in the range of the predetermined colors, move directly to the step S4 for subsequent operations.

Figure 4:
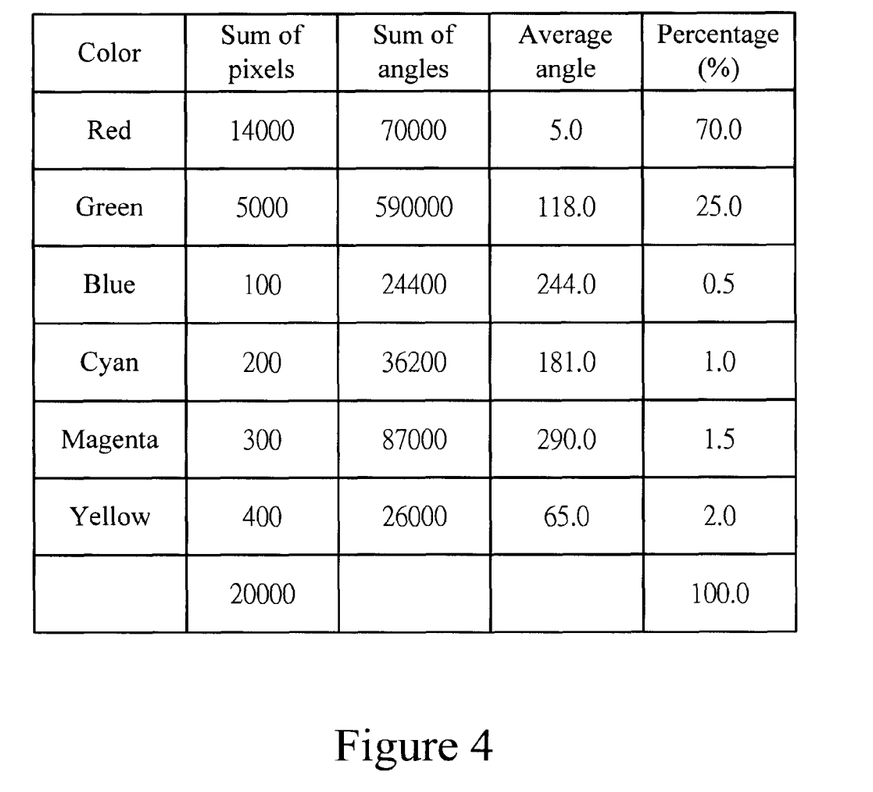
FIG. 4 is a data table of calculation signals according to a preferred embodiment of the present invention.

For convenience of description, the content of the calculation signals of the calculation unit 33 is shown in FIG. 4. In the following description, contrast colors are used for example. The present table in FIG. 4 includes sum of pixel number, sum of angles in the hue-coordinate, average angle in the hue-coordinate, and proportion to the whole frame, of three sets of contrast colors. That is, the table includes information of three sets of contrast colors of the input color signal. The adjustment unit 35 adjusts the input color signal in accordance with at least two of the predetermined color values in FIG. 2 and the calculation signals in FIG. 4.

As shown in FIG. 2, the difference between central values of the predetermined color values in the hue-coordinates of red and of cyan, which colors are contrast to each other, is 180 degrees as shown below:

$|0-180|=180$

On the other hand, the difference between average angles in the hue-coordinates of red and of cyan is 176 degrees as shown below:

$|5-181|=176$

Thereby, in order to make frames more vivid, it is necessary to adjust the difference between average angles in the hue-coordinates of red and of cyan, so that the difference is identical to the difference between central values of the predetermined hue-coordinates of red and of cyan, that is, 180 degrees:

$|180-176|=4$

Hence, in order to compensate the 4-degree difference, decrease the average angle of the color red of the input color signal by four degrees, that is, decrease the angle in the hue-coordinate of each pixel of the color red by four degrees, so that the difference between average angles in the hue-coordinates of red and of cyan is identical to the difference between central values of the predetermined hue-coordinates of red and of cyan. The adjustment method described above can also adjust the angle in the hue-coordinate of the color cyan of the input color signal alone, or can adjust the angles in the hue-coordinate of both colors, red and cyan, of the input color signal, so that the difference between average angles of red and of cyan is 180 degrees.

Furthermore, the present invention can also utilize complementary colors for adjustment. As shown in FIG. 2, the difference between central values of the predetermined color values in the hue-coordinates of red and of green, which colors are complementary to each other, is 120 degrees as shown below:

$|120-0|=120$

On the other hand, the difference between average angles in the hue-coordinates of red and of green is 113 degrees as shown below:

$|118-5|=113$

Thereby, it is necessary to adjust the difference between average angles in the hue-coordinates of red and of green, so that the difference is identical to the difference between central values of the predetermined hue-coordinates of red and of green, that is, 120 degrees:

$|120-113|=7$

Hence, in order to compensate the 7-degree difference, decrease the average angle of the color red of the input color signal by 7 degrees, so that the average angle of the color red of the input color signal turns to be −2 degrees. Thereby, the difference between average angles of red and of green is identical to the difference between central values of predetermined red and of predetermined green. The adjustment method described above can also adjust the average angle of the color green of the input color signal alone, or can adjust the average angles of both colors, red and green, of the input color signal, so that the difference between average angles of the colors is 120 degrees. Further, we can utilize the methods described in abovementioned embodiment to adjust at least one of red-cyan contrast, green-magenta contrast, blue-yellow contrast, red-green complement, orange-blue complement, and yellow-purple complement to achieve a better appearance of frames.

In addition to the preceding embodiment, there is another embodiment for color adjustment. Please further refer to FIG. 2. Here, we still take red-cyan contrast for example. We can get average angles for color red and color cyan by the calculation operation on color signals shown in FIG. 3. Beside, we also know the central values of the predetermined hue-coordinates of red and of cyan are 0 degree and 180 degree respectively. Thus, we can adjust the average angles for color red and color cyan directly to the central values of the predetermined hue-coordinates for color red and color cyan to achieve the better appearance of frames without operations, which have the absolute value of the difference between the average angles and the central values for color red and color cyan. This embodiment is only another method for color adjustment. Therefore, it is still included in the appended claims of the present invention. Moreover, more particularly, this embodiment is not used to limit the scope and range of the present invention. In an embodiment, the predetermined color values in FIG. 2 can be programmed by the user.

Figure 5:
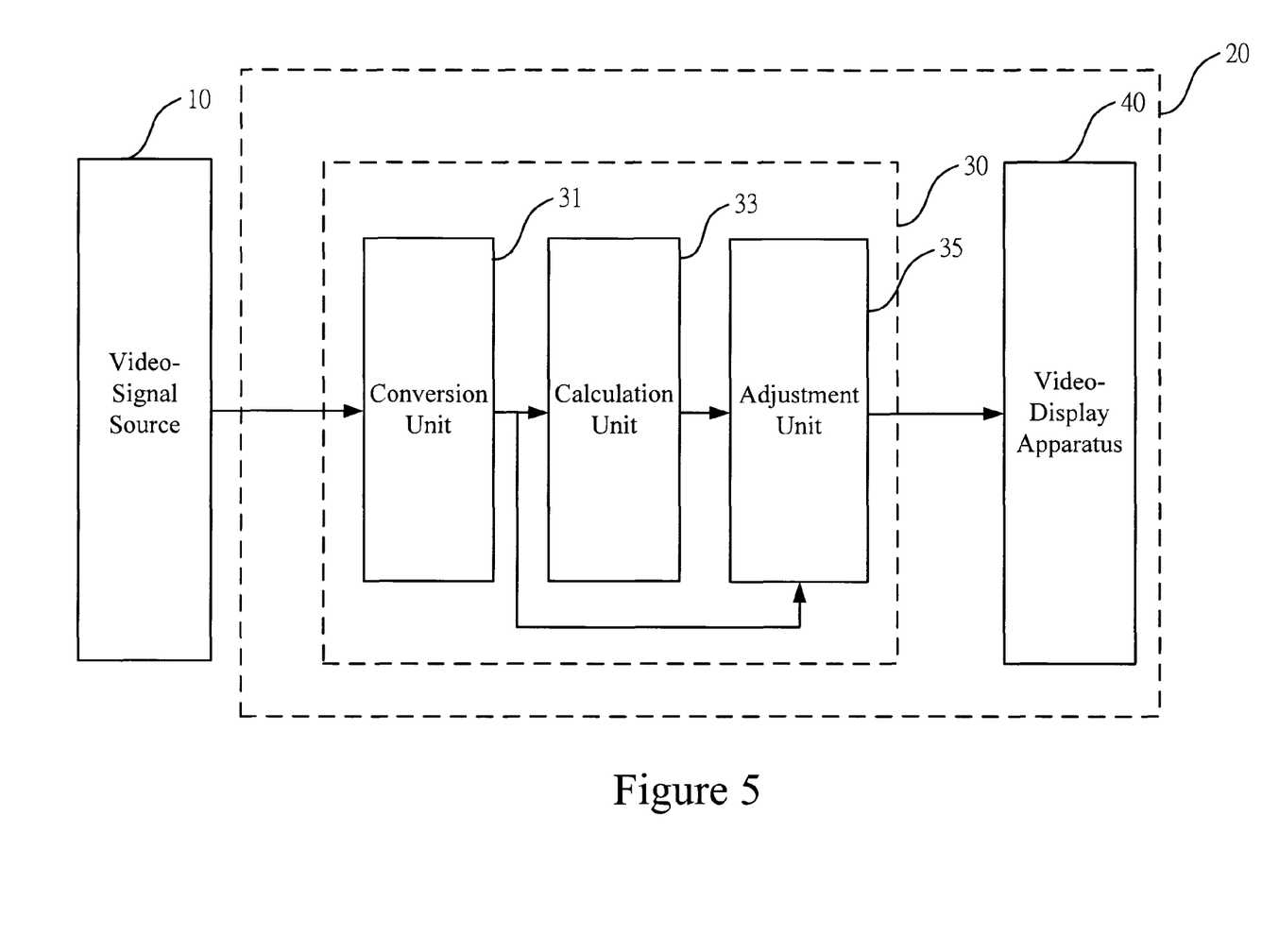
FIG. 5 is a block diagram according to another preferred embodiment of the present invention.

FIG. 5 is a block diagram according to another preferred embodiment of the present invention. As shown in the figure, in the present embodiment, the color adjustment apparatus 30 further includes a conversion unit 31. When the video-signal source 10 generates an input color signal in non-HIS format, the conversion unit 31 converts the input color signal in non- HIS format to a converted signal in HIS format. That means the converted signal is an input color signal in HIS format. For example, the non-HIS format can be RGB, YCbCr, YUV, or other video formats in the prior art. The converted signal is transmitted to the calculation unit 33 for dividing the converted signal into color groups and for performing a calculation operation thereon to generate calculation signals.

Figure 6:
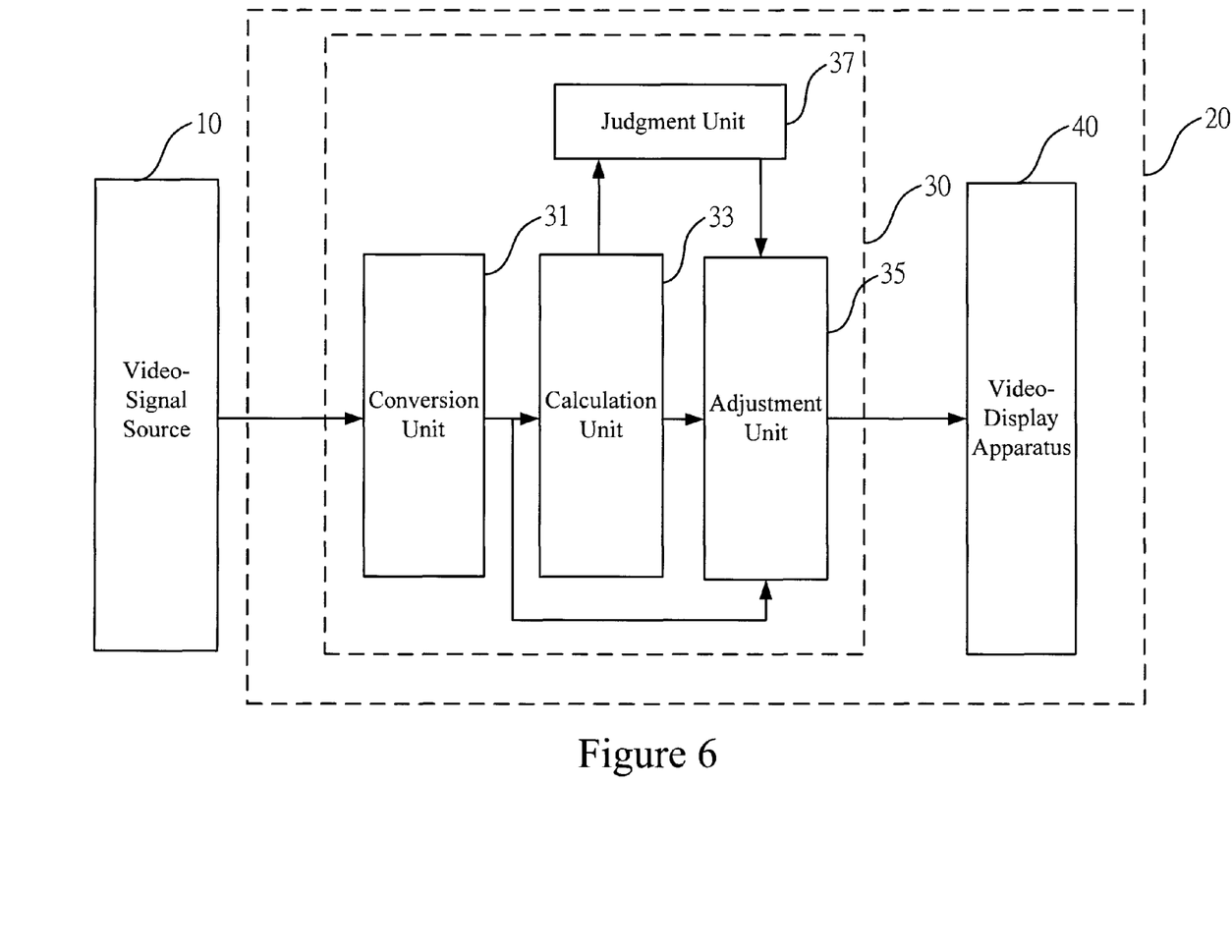
FIG. 6 is a block diagram according to still another preferred embodiment of the present invention.

FIG. 6 is a block diagram according to still another preferred embodiment of the present invention. As shown in the figure, the difference between the color adjustment apparatus 30 in FIG. 6 and the one in FIG. 5 is that the color adjustment apparatus 30 in FIG. 6 further includes a judgment unit 37, which is coupled to the operation unit 33 and the adjustment unit 35, for receiving the calculation signals and for transmitting a judgment signal to the adjustment unit 35. The judgment unit 37 judges the state of the calculation signals and determines if adjustments to specific color will be performed, wherein the state is at least one of group percentages of saturation, intensity, and hue distribution for pixels in a frame in HIS format. In an embodiment, the state is percentages of hue distribution.

For example, if the ratio of the sum of red pixel number to total pixel number exceeds 50 percent, then a judgment signal is transmitted to the adjustment unit 35 for adjusting H-coordinate of color red. If not, the adjustment unit 35 does not adjust H-coordinate of color red. The same method can be used for judging if I-coordinate or S-coordinate needs to be adjusted.

In addition to adjusting angles in the hue-coordinate of input color signals alone such that the color presented is adjusted accordingly, the present invention can also adjust the intensity-coordinate alone, or the saturation-coordinate alone, of color signals for adjusting presented color to be brighter, darker, or stronger. Certainly, the present invention can also adjust at least one of groups of hue-coordinate, the intensity-coordinate, and the saturation-coordinate, of the input color signal for adjusting presented color to improve the appearance of frames. Consequently, the purpose of presenting optimum frames can be achieved, and viewers can thereby acquire maximum visual enjoyment.

Accordingly, the present invention conforms to the legal requirements owing to its novelty, unobviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A color adjustment apparatus, comprising:
a calculation unit, for receiving an input color signal, and dividing the input color signal into color groups and performing a calculation operation thereon to generate and output at least two calculation signals; and
an adjustment unit, coupling to the calculation unit and configured to receive as inputs the calculation signals and the input color signal, configured to obtain a first difference value between a first phase-angle value of a first color and a second phase-angle value of a second color, wherein the first color and the second color are a contrast/complement pair of a contrast/complement group of the input color signal, and to obtain a second difference value between the first difference value and a predetermined color value, and further configured to adjust at least one of the first phase-angle value of the first color and the second phase-angle value of the second color for compensating the second difference between the first difference value and the predetermined color value and to generate an output color signal, for input to a video display.

2. The apparatus of claim 1, wherein the color groups comprise red, green, and blue groups.

3. The apparatus of claim 2, wherein the color groups further comprise cyan, magenta, and yellow groups.

4. The apparatus of claim 3, wherein the contrast group comprises red-cyan contrast group, green-magenta contrast group, and blue-yellow contrast group.

5. The apparatus of claim 2, wherein the color groups further comprise orange, yellow, and purple groups.

6. The apparatus of claim 5, wherein the complement group comprises red-green complement group, orange-blue complement group, and yellow-purple complement group.

7. The apparatus of claim 1, further comprising a conversion unit, coupling to the calculation unit and the adjustment unit, for converting a format of the input color signal.

8. The apparatus of claim 1, wherein the input color signal is a color signal in HIS format.

9. The apparatus of claim 1, and further comprising:
a judgment unit, coupling to the calculation unit and the adjustment unit, for generating a judgment signal according to a state of the calculation signal, and transmitting the judgment signal to the adjustment unit, wherein the adjustment unit determines if the input color signal should be adjusted according to the judgment signal.

10. The apparatus of claim 9, wherein the state comprises percentages of at least one of saturation distribution state, intensity distribution state, and hue distribution state of at least one of the color groups for pixels in a frame in HIS format.

11. The apparatus of claim 1, wherein the adjustment unit adjusts at least one of hue-coordinate, intension-coordinate and saturation-coordinate of at least one of the contrast group and the complementary group of the input color signal to achieve color adjustment.

12. The apparatus of claim 1, wherein the calculation signal comprises a pixel count in a frame for one of the color groups and an average angle of pixels in the frame for the color group in hue-coordinate.

13. A color adjustment method, comprising:
receiving an input color signal;
in a calculation circuit, dividing the input color signal into color groups, and performing a calculation operation thereon, to generate at least two calculation signals;
obtaining a first difference value between a first phase-angle value of a first color and a second phase-angle value of a second color, wherein the first color and the second color are a contrast/complement pair of a contrast/complement group of the input color signal;
obtaining a second difference value between the first difference value and a predetermined color value;
in an adjustment circuit, adjusting at least one of the first phase-angle value of the first color and the second phase-angle value of the second color for compensating the second difference between the first difference value and the predetermined color value; and
generating an output color signal for displaying.

14. The method of claim 13, wherein the contrast group comprises red-cyan contrast group, green-magenta contrast group, and blue-yellow contrast group.

15. The method of claim 13, wherein the complement group comprises red-green complement group, orange-blue complement group, and yellow-purple complement group.

16. The method of claim 13, and further comprising:
generating a judgment signal according to a state of the calculation signal to determine if the input color signal should be adjusted.

17. The method of claim 16, wherein the state comprises percentages of at least one of saturation distribution state, intensity distribution state, and hue distribution state of at least one of the color groups for pixels in a frame.

18. The method of claim 13, wherein the step of adjusting the input color signal comprises:
adjusting at least one of hue-coordinate, intension-coordinate and saturation-coordinate of at least one of the contrast group and the complementary group of the input color signal.

19. The method of claim 13, wherein the calculation signal comprise pixel count in a frame for one of the color groups and average angle of pixels in the frame for the color group in hue-coordinate.

20. The color adjustment apparatus of claim 1, wherein the input signal is in HIS (Hue, Intensity, Saturation) format and wherein the calculation unit is further configured to determine whether coordinates of a pixel of the input color signal falls in the range of the predetermined colors and, if so, then an accumulated number of pixels is increased by one, and a phase angle in an H-coordinate of the pixel is accumulated.

* * * * *